United States Patent [19]
Kawasaki et al.

[11] Patent Number: 5,687,158
[45] Date of Patent: Nov. 11, 1997

[54] OPTICAL DISK RECORDING AND REPRODUCING APPARATUS FOR COMPRESSED SIGNALS

[75] Inventors: Takashi Kawasaki, Tokyo; Nobumasa Suzuki, Hachioji; Hideo Ueno, Kawasaki; Tomomi Matsumura, Hino, all of Japan

[73] Assignee: Kabushiki Kaisha Kenwood, Tokyo, Japan

[21] Appl. No.: 645,037

[22] Filed: May 15, 1996

Related U.S. Application Data

[63] Continuation of Ser. No. 402,329, Mar. 10, 1995, abandoned, which is a continuation of Ser. No. 141,576, Oct. 27, 1993, abandoned.

[30] Foreign Application Priority Data

Oct. 29, 1992 [JP] Japan ............................... 4-291413

[51] Int. Cl.$^6$ ...................................................... G11B 7/00
[52] U.S. Cl. ............................................................ 369/124
[58] Field of Search ............................... 369/47, 54, 59, 369/76, 83, 124, 48, 49; 360/19.1, 8, 13, 15, 40, 23, 18, 9.1, 36.1, 36.2; 358/341, 342, 344

[56] References Cited

U.S. PATENT DOCUMENTS

| | | | |
|---|---|---|---|
| 4,910,605 | 3/1990 | Sasaki et al. | 360/10.3 X |
| 4,920,424 | 4/1990 | Hosaka et al. | 360/19.1 X |
| 5,130,816 | 7/1992 | Yoshio | 358/341 |
| 5,224,087 | 6/1993 | Maeda et al. | 369/47 X |
| 5,243,588 | 9/1993 | Maeda et al. | 369/60 |
| 5,325,347 | 6/1994 | Sako | 369/48 |
| 5,412,628 | 5/1995 | Yamazaki et al. | 369/32 |

FOREIGN PATENT DOCUMENTS

| | | |
|---|---|---|
| 0370670 | 5/1990 | European Pat. Off. . |
| 0465053 | 8/1992 | European Pat. Off. . |
| 60-201572 | 11/1986 | Japan . |
| 1223669 | 6/1989 | Japan . |
| 2122472 | 10/1990 | Japan . |
| 4030372 | 3/1992 | Japan . |

*Primary Examiner*—Thang V. Tran
*Attorney, Agent, or Firm*—Sixbey Friedman Leedom & Ferguson; Gerald J. Ferguson, Jr.; Evan R. Smith

[57] ABSTRACT

An optical disc recording/reproducing apparatus capable of performing the operation of recording, reproducing, or recording and reproducing a plurality channel of signals efficiently and in a short time, by controlling memories. The apparatus has a compressor for compressing an input signal supplied via an A/D converter, a first memory for storing the compressed signal, a disc recording unit having a modulator for modulating the compressed signal and a head block for recording the modulated signal on an optical disc, a disc reproducing unit having a demodulator for demodulating the compressed signal read from the optical disc by the head block, a second memory for storing the demodulated signal, an expander for expanding the demodulated signal read from the second memory, and a D/A converter for converting the read signal.

2 Claims, 6 Drawing Sheets

OPTICAL DISK RECORDING AND REPRODUCING APPARATUS FOR COMPRESSED SIGNALS

This application is a Continuation of Ser. No. 08/402,329, filed Mar. 10, 1995, now abandoned; which is a continuation of Ser. No. 08/141,576, filed Oct. 27, 1993, now abandoned.

BACKGROUND OF THE INVENTION

1. Field of the Invention

The present invention relates to an optical disk recording/reproducing apparatus, and more particularly to an optical disc recording/reproducing apparatus suitable for performing the operation of recording, reproducing, or recording and reproducing a plurality channel of signals.

2. Related Background Art

Figure 5:
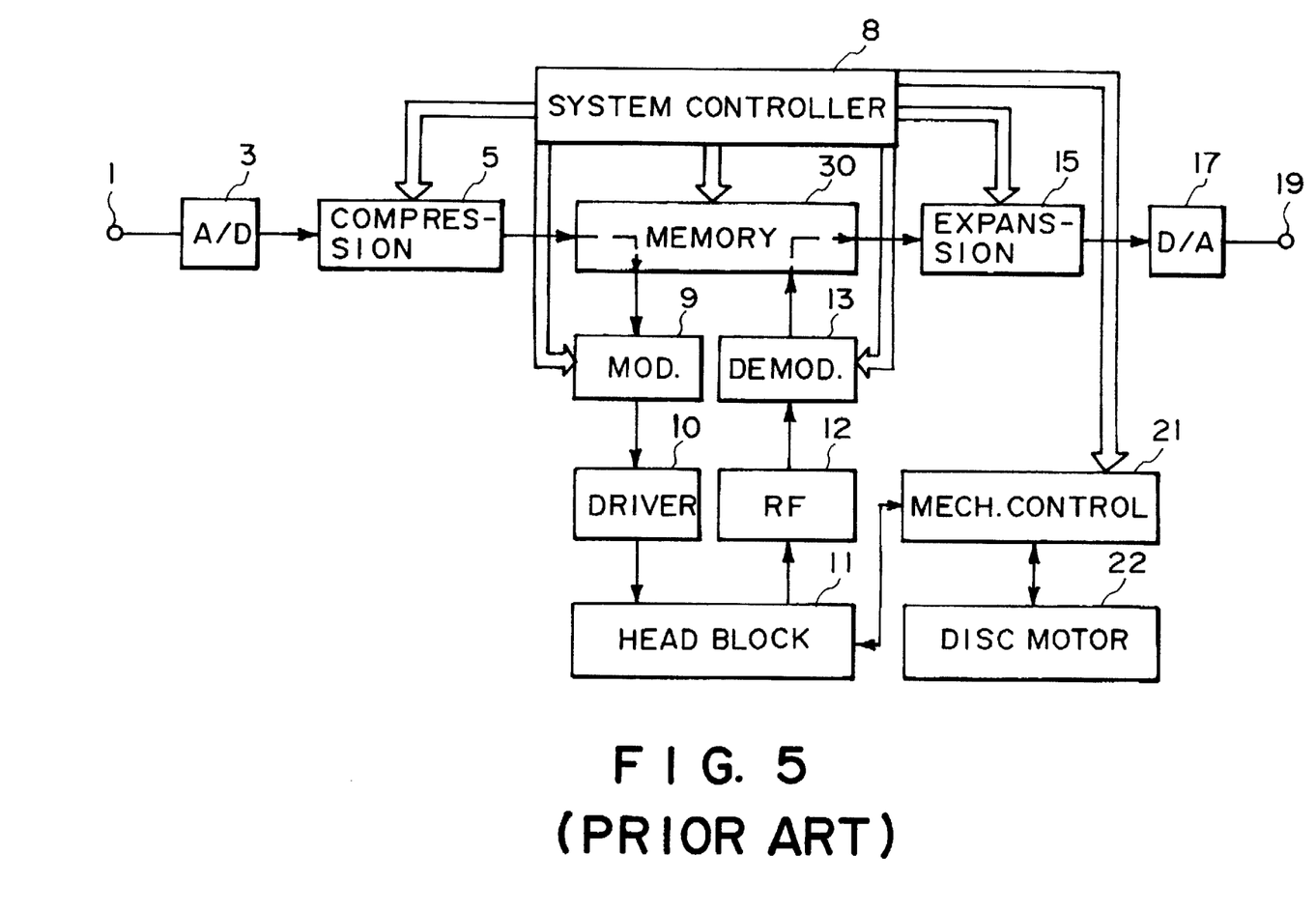
FIG. 5 is a block diagram showing a conventional optical recording/reproducing apparatus.

Most of conventional optical disc recording/reproducing apparatuses have the structure such as shown in the block diagram of FIG. 5. In FIG. 5, reference numeral 1 represents an audio signal input terminal. An audio signal inputted to this terminal 1 is converted into a digital signal by an A/D converter 3 and compressed time sequentially. The compressed digital signal is stored in a memory 30 under the control of a system controller 8.

The system controller 8 is constructed mainly of a microcomputer to control the circuits of the apparatus. The system controller 8 includes essentially a CPU, a ROM, a RAM, an input port, and an output port (not shown), as well known in the art. ROM stores programs for controlling CPU. In accordance with the programs, CPU fetches external data via the input port, transfers data to and from RAM, to process data and output, if necessary, the processed data from the output port.

Reference numeral 9 represents a modulator for RF modulating the digital signal stored in the memory 30 and supplying the modulated signal to a driver 10 to drive an integrated head block 11 having a magnetic head pickup and to record data on a disc (not shown). In this manner, the input record signal is recorded on the disc at predetermined areas in the form of time sequentially compressed signals.

Reference numeral 12 represents an RF amplifier for RF amplifying a signal reproduced by the head block 11. The amplified signal is supplied to a demodulator 13 and stored in the memory 30. The reproduced compressed signal is expanded by an expander 15 and converted into an analog signal by a D/A converter 17 to be outputted from an output terminal 19.

Reference numeral 21 represents a mechanism controller for controlling the mechanism of the head block 11, under the control of the system controller 8. Reference numeral 22 represents a disc motor connected to the mechanism controller 21.

Figure 6:
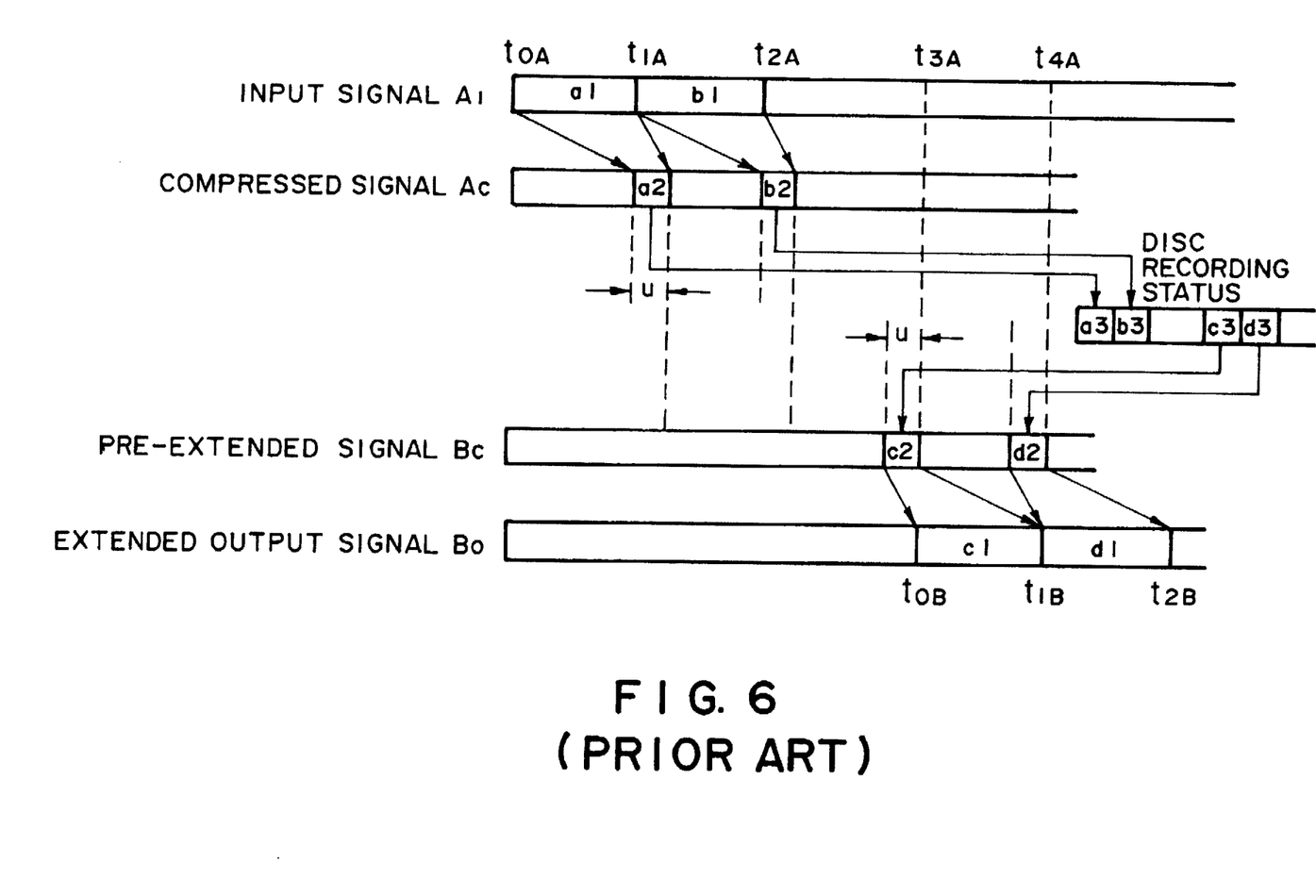
FIG. 6 is a timing chart explaining conventional recording and reproducing operations.

With the optical disc recording/reproducing apparatus constructed as above, the operation of recording/reproducing an audio signal is performed in the manner explained in the timing chart of FIG. 6.

In recording an input signal $A_I$ applied to the input terminal 1, the signal $A_I$ is converted into a digital signal by the A/D converter 3. The digital signal is divided into groups ($a_1, b_1, \ldots$) each having 512 samples and compressed by the compressor 5 to generate a compressed signal $A_C$. Namely, the input signal $a_1$ is compressed to generate a compressed signal $a_2$, the input signal $b_1$ is compressed to generate a compressed signal $b_2$, and so on. The compressed signal $A_C$ is therefore formed by the compressed signals $a_2, b_2, \ldots$. Assuming that the signals $a_1, b_1, \ldots$ are inputted during the time periods ($t_{0A}$ to $t_{1A}$), ($t_{1A}$ to $t_{2A}$), $\ldots$, the signals $a_1, b_1, \ldots$ are compressed to generate the compressed signals $a_2, b_2, \ldots$ during a predetermined compression time period u starting from $t_{1A}, t_{2A}, \ldots$ to constitute the compressed signal $A_C$ which is stored in the memory 30.

The input signal $A_I$ stored as the compressed signal $A_C$ in the memory is recorded time sequentially on the disc at predetermined areas as recorded signals $a_3, b_3, \ldots$ while driving the disc motor 22 and moving the magnetic head of the head block 11 under the control of the mechanism controller 21 which is supervised by the system controller 8.

In reproducing the recorded signal, while the disc motor 22 is driven and the magnetic head of the head block 11 is moved under the control of the mechanism controller 21 which is supervised by the system controller, signals $c_3, d_3, \ldots$ time sequentially recorded on the disc are picked up by the magnetic head as a pre-expanded or pre-extended signal $B_C$ constituted by pre-expanded signals $c_2, d_2, \ldots$ which are then expanded to generate extended or expanded output signals $c_1, d_1, \ldots$ during the time periods ($t_{0B}$ to $t_{1B}$), ($t_{1B}$ to $t_{2B}$), $\ldots$ as an output signal $B_O$. In the above manner, the input signal $A_I$ can be recorded and the recorded signal can be reproduced as the output signal $B_O$.

With such a conventional optical disc recording/reproducing apparatus, however, since the memory 30 cannot be used at the same time for both the recording operation and reproducing operation, the recording and reproducing operations are required to be executed separately and hence time sequentially, as explained with FIG. 6. It takes therefore a long time to execute the recording and reproducing operations.

SUMMARY OF THE INVENTION

The present invention has been made in consideration of the above circumstances. It is therefore an object of the invention to solve the above-described problems and provide an optical disc recording/reproducing apparatus capable of time divisionally recording/reproducing signals of a plurality of channels by providing separate memories respectively for the recording and reproducing operations.

According to one aspect of the present invention, there is provided an optical disc recording/reproducing apparatus of the type having a memory for storing a compressed signal of an input signal, a modulator for modulating the compressed signal read from the memory, a head block for recording the modulated and compressed signal on an optical disc and reproducing the modulated and compressed signal recorded in the optical disc, a demodulator for demodulating the modulated and compressed signal, the demodulated and compressed signal being stored in the memory, an expander for expanding the demodulated and compressed signal read from the memory to output an original signal, wherein:

the memory includes a first memory and a second memory, the first memory storing a plurality channel of the compressed signals, and the second memory storing a plurality channel of the demodulated and compressed signals, the read/write to and from the first and second memories for one channel of the compressed signals and the demodulated and compressed signals is executed alternately and time divisionally using idle time periods generated between adjacent ones of another channel of the compressed signals and demodulated and compressed signals, to thereby allow to execute the operation of recording, reproducing, or recording and reproducing a plurality channel of signals.

According to the invention, an input signal to be recorded is converted into a digital signal by an A/D circuit, compressed, and stored in the first memory. The compressed signal read from the first memory is supplied to the modulator and applied to the head block to record it on an optical disc at predetermined record trucks while controlling a disc motor and moving a magnetic head of the head block by a mechanism controller which is supervised by a system controller.

The compressed signal recorded on the optical disc is picked up by the head block, and stored via an RF amplifier and the demodulator in the second memory. The demodulated and compressed signal read from the second memory under the control of the system controller, is expanded by the expander, and converted into an analog signal to output the reproduced signal.

For the operation of recording a plurality channel of signals, a signal of one channel is processed during idle time periods generated between adjacent signals of another channel, the signal of one channel being alternately and time divisionally processed relative to the signal of another channel one after another.

Therefore, the operation of recording a plurality channel of signals can be performed efficiently and in a short time.

Similarly, for the operation of reproducing, or recording and reproducing a plurality channel of signals, the idle time periods of one channel are used for processing another channel while controlling the memory read/write time divisionally. For example, a plurality type of musical audio tone signals may be recorded on multiple trucks and reproduced to generate desired musical tones of a high quality in various manners.

DETAILED DESCRIPTION OF THE PREFERRED EMBODIMENTS

Figure 1:
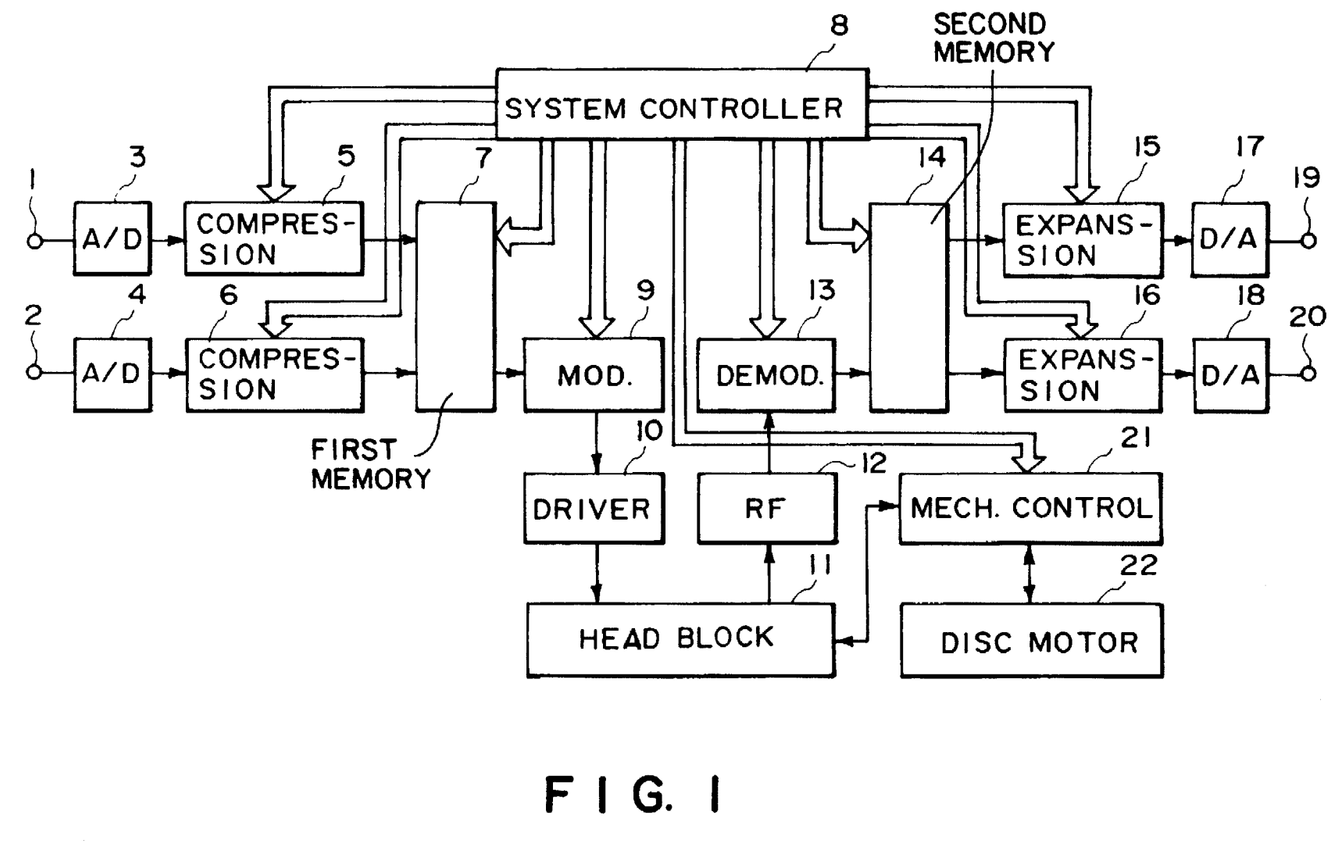
FIG. 1 is a block diagram showing an embodiment of an optical recording/reproducing apparatus according to the present invention.
Figure 2:
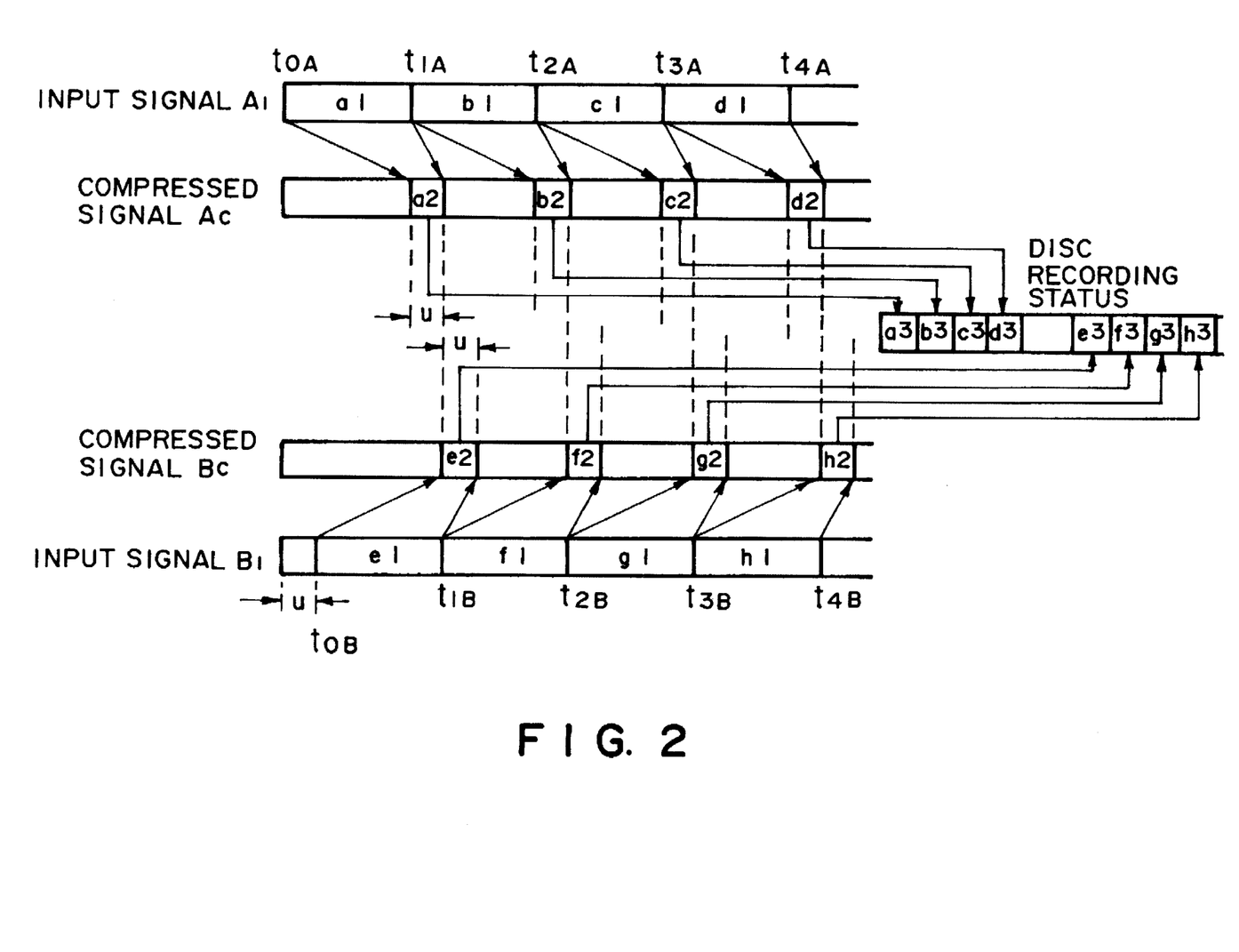
FIG. 2 is a timing chart explaining the operation of time divisionally recording a plurality channel of signals.
Figure 3:
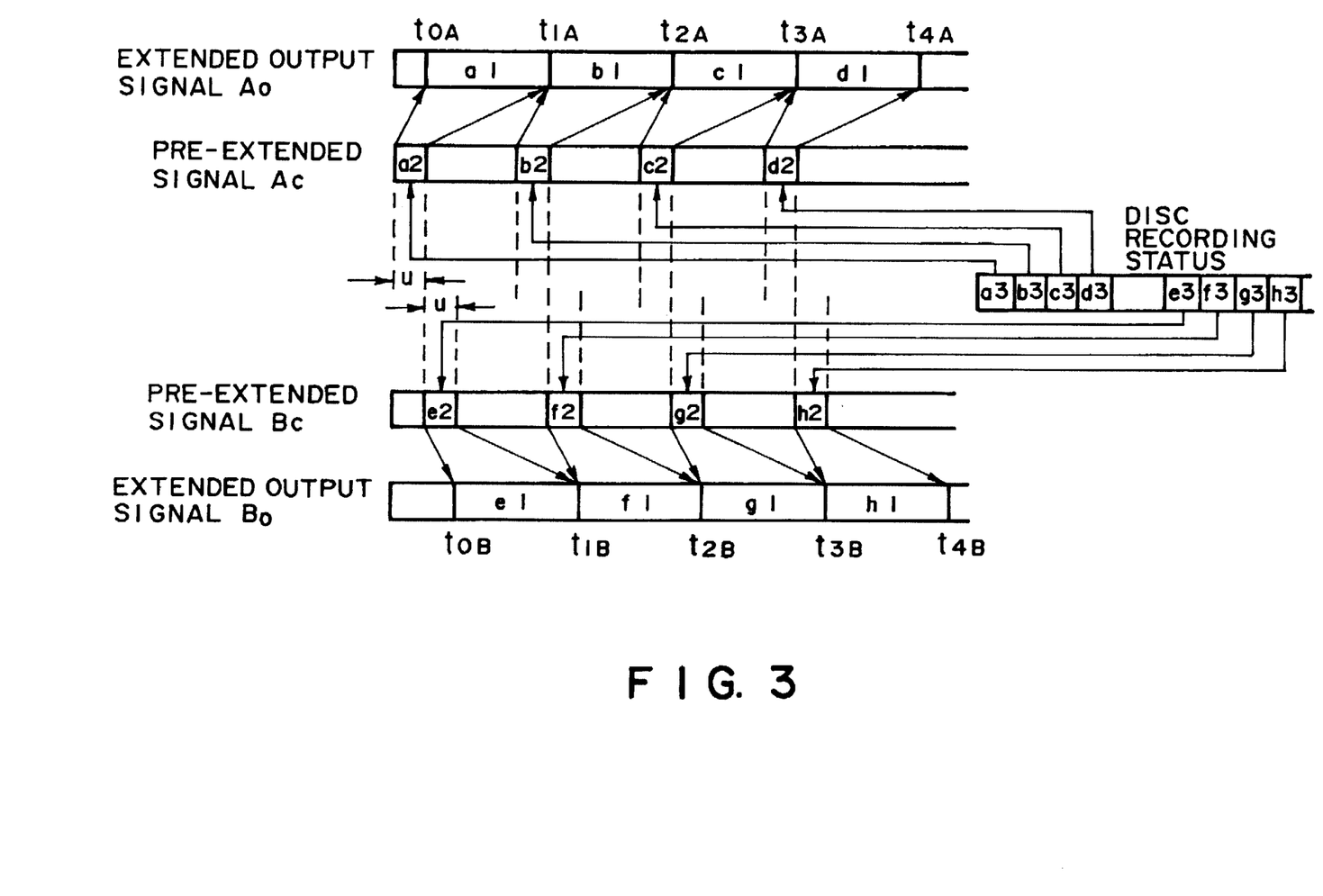
FIG. 3 is a timing chart explaining the operation of time divisionally reproducing a plurality channel of signals.
Figure 4:
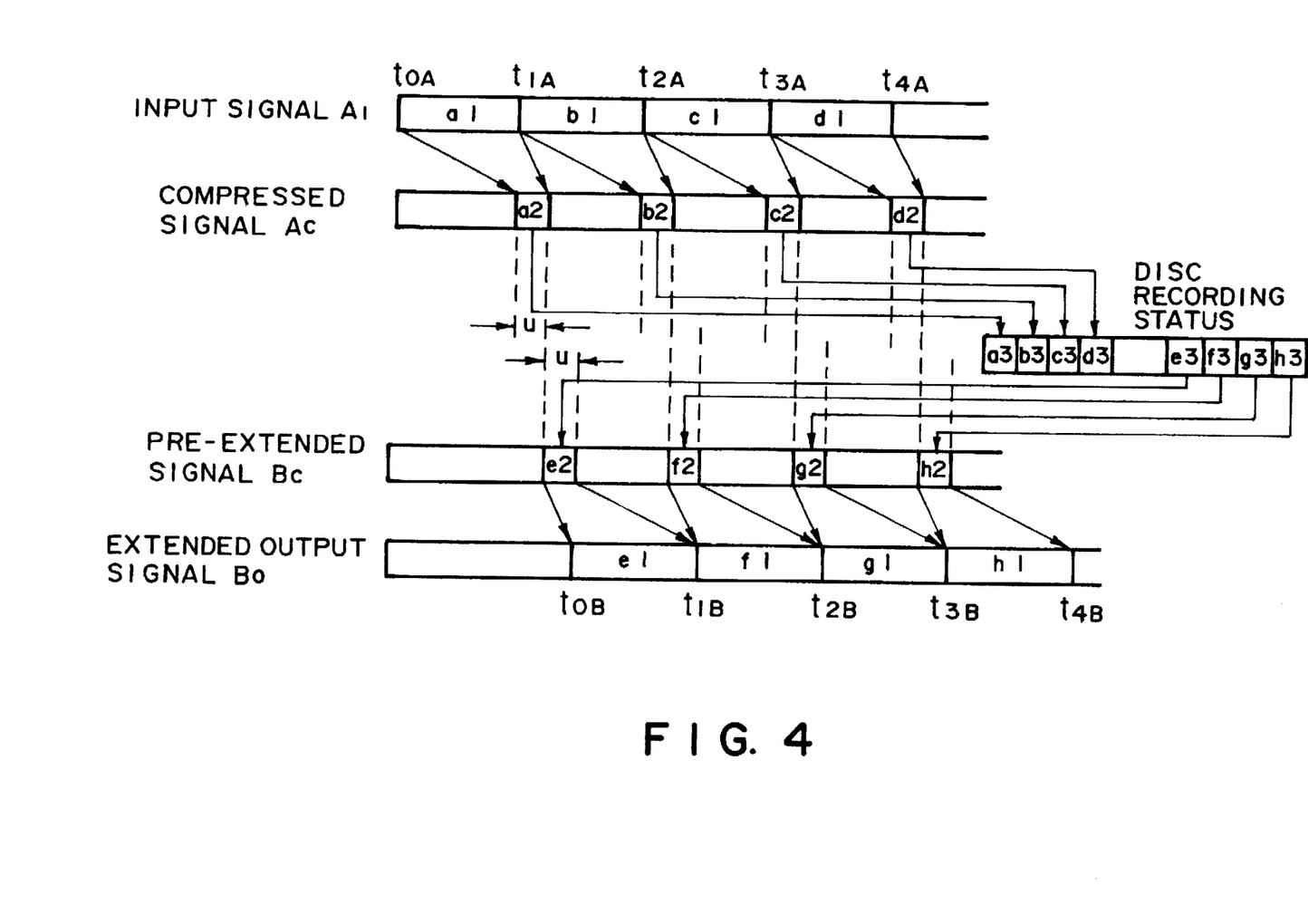
FIG. 4 is a timing chart explaining the operation of time divisionally recording and reproducing a plurality channel of signals.

Embodiments of the optical disc recording/reproducing apparatus of the present invention will be described with reference to FIGS. 1 to 4. In FIGS. 1 to 4, like elements to those shown in FIGS. 5 and 6 are represented by identical reference numerals and symbols. FIGS. 1 is a block diagram showing the optical disc recording/reproducing apparatus of the invention, and FIGS. 2 to 4 are timing charts explaining the operations of time divisionally recording a plurality channel of signals, reproducing a plurality channel of signals, and recording and reproducing a plurality channel of signals, respectively.

Referring to FIG. 1, reference numeral 1 represents an input terminal for an audio signal $A_I$ to be recorded, and reference numeral 2 represents an input terminal for an audio signal $B_I$ to be recorded. Reference numeral 3 represents an A/D converter for converting the input signal $A_I$ into a digital signal, and reference numeral 4 represents an A/D converter for converting the input signal $B_I$ into a digital signal. Reference numerals 5 and 6 each represent a compressor for compressing the digital signal in the format predetermined by a system controller 8. Reference numeral 7 represents a first memory for storing the converted digital signals for the input signals $A_I$ and $B_I$. Under the control of the system controller 8, the converted digital signals of two channels stored in the first memory 7 are read and supplied to a modulator 9. The modulated signal is then supplied to a driver 10 for driving a magnetic head of an integrated head block 11 to record the modulated signal.

A signal recorded on the disc is picked up by the head block 11 and amplified by an RF amplifier 12. The amplified signal is demodulated by a demodulator 13 and stored in a second memory 14. Under the control of the system controller 8, the demodulated signals of two channels are read from the second memory 14, expanded by expanders 15 and 16, and converted to analog signals by D/A converters 17 and 18 to be outputted from output terminals 19 and 20.

The optical disc recording/reproducing apparatus constructed as above can time divisionally record, reproduce, or record and reproduce a plurality channel of signals.

FIG. 2 is a timing chart explaining the operation of time divisionally recording signals of two channels. An input signal $A_I$ is converted into a digital signal by the A/D converter 3. The digital signal is divided into groups ($a_1$, $b_1$, $c_1$, $d_1$ ...) each having, e.g., 512 samples, and compressed by the compressor 5 to generate a compressed signal $A_C$. Namely, the input signal $a_1$ is compressed to generate a compressed signal $a_2$, the input signal $b_1$ is compressed to generate a compressed signal $b_2$, and so on. The compressed signal $A_C$ is therefore formed by the compressed signals $a_2$, $b_2$, $c_2$, $d_2$, ..... Assuming that the signals $a_2$, $b_2$, ... are inputted during the time periods ($t_{0A}$ to $t_{1A}$), ($t_{1A}$ to $t_{2A}$), ..., the signals $a_1$, $b_1$, ... are compressed to generate the compressed signals $a_2$, $b_2$, ... during a predetermined compression time period u starting from $t_{1A}$, $t_{2A}$, ... to constitute the compressed signal $A_C$ which is stored in the first memory 7.

Similarly, the input signal $B_I$ is converted into a digital signal by the A/D converter 4. The digital signal is divided into groups ($e_1$, $f_1$, $g_1$, $h_1$ ...) each having, e.g., 512 samples, and compressed by the compressor 6 to generate a compressed signal $B_C$. Namely, the input signal $e_1$ is compressed to generate a compressed signal $e_2$, the input signal $f_1$ is compressed to generate a compressed signal $f_2$, and so on. The compressed signal $B_C$ is therefore formed by the compressed signals $e_2$, $f_2$, $g_2$, $h_2$, ..... Assuming that the signals $a_1$, $b_1$, ... are inputted during the time periods ($t_{0B}$ to $t_{1B}$), ($t_{1B}$ to $t_{2B}$), ..., the signals $e_1$, $f_1$, ... are compressed to generate the compressed signals $e_2$, $f_2$, ... during the predetermined compression time period u starting from $t_{1B}=(t_{1A}+u)$, $t_{2B}=(t_{2A}+u)$, ... to constitute the compressed signal $B_C$ which is stored in the first memory 7.

Under the control of the system controller 8, the input signals $A_I$ and $B_I$ stored as the compressed signals $A_C$ and $B_C$ including signals $a_2$, $b_2$, ... and $e_2$, $f_2$, ... in the first memory 7 and modulated by the modulator 9 are recorded time divisionally on a disc (not shown) at predetermined truck areas as recorded signals $a_3$, $b_3$, ... and $e_3$, $f_3$, ... while driving the disc motor 22 and moving the magnetic head of the head block 11 under the control of the mechanism controller 21 which is supervised by the system controller 8.

After the compressed signal $a_2$ read from the first memory 7 is modulated by the modulator and recorded on the disc, there is an idle time period for the first memory 7 until the next compressed signal $b_2$ is read and modulated by the modulator. Therefore, during this idle time period, the next compressed signal $e_2$ is read and modulated by the modulator 9. In this manner, the compressed signals $a_2$, $b_2$, ... and $e_2$, $f_2$, ... are alternately and time divisionally recorded on the disc by using idle time periods.

As described above, the input signals $A_I$ and $B_I$ are recorded on the disc in the order of $a_3$, $b_3$, ... and $e_3$, $f_3$, ... as shown in FIG. 2 while driving the disc motor 22 and moving the magnetic head of the head block 11 under the control of the mechanism controller 21 which is supervised by the system controller 8.

Since the compressed signals $a_2$, $b_2$, ... and $e_2$, $f_2$, ... of the two-channel input signals $A_I$ and $B_I$ can be alternately and time divisionally recorded by using the idle time periods, the recording time of a plurality channel of signals can be shortened efficiently.

FIG. 3 is a timing chart explaining the operation of time divisionally reproducing signals of two channels and outputting reproduced signals $A_O$ and $B_O$. Contrary to the recording operation, the recorded signals $a_3$, $b_3$, ... and $e_3$, $f_3$, ... are picked up by the magnetic head of the head block 11, amplified by the RF amplifier 12, demodulated by the demodulator 13, and stored in the second memory 14. Under the control of the system controller 8, the demodulated signals, i.e., pre-extended or pre-expanded signals $a_2$, $b_2$, ... and $e_2$, $f_2$, ... are alternately and time divisionally read from the second memory 14, expanded by the expanders 15 and 16 to obtain reproduced signals $A_O$ ($a_1$, $b_1$, ... ) and $B_O$ ($e_1$, $f_1$, ... ) which are converted into analog audio signals and outputted from output terminals 19 and 20.

Of the pre-expanded signals $a_2$, $b_2$, ... and $e_2$, $f_2$, ... stored in the second memory, the signal $a_2$ compressed by the predetermined compression time period u is expanded to the signal $a_1$ having a time period ($t_{OA}$ to $t_{1A}$), the signal $b_2$ compressed to the time period u is expanded to the signal $b_1$ having a time period ($t_{1A}$ to $t_{2A}$), and so on.

The signal $e_2$ compressed by the predetermined compression time period u is expanded to the signal $e_1$ having a time period ($t_{OB}$ to $t_{1B}$) following $t_{OA}$, the signal $f_2$ compressed to the time period u is expanded to the signal $f_1$ having a time period ($t_{1B}$ to $t_{2B}$) following $t_{1A}$, and so on.

Similar to the recording operation, the signals $e_2$, $f_2$, ... can be time divisionally read during the idle time periods between the signals $a_2$ and $b_2$, $b_2$ and $c_2$, ... at the compression time period u. The signals $e_2$, $f_2$, ... are then expanded by the respective channel expanders 15 and 16 and reproduced. In this manner, signals of two channels can be alternately and time divisionally reproduced.

FIG. 4 is a timing chart explaining the operation of time divisionally recording and reproducing signals of two channels. The signals $a_1$, $b_1$, ... of the input signal $A_I$ are compressed. The compressed signals $a_2$, $b_2$, ... constituting the compressed signal $A_C$ are recorded on a disc as signals $e_3$, $f_3$, ... . On the other hand, the recorded signals $e_3$, $f_3$, ... are demodulated and stored in the second memory 14 as pre-expanded signals $e_2$, $f_2$, ... which are then read therefrom alternately and time divisionally relative to reading the compressed signals $a_2$, $b_2$, ... and expanded by the expanders 15 and 16 to output a reproduced signal $B_O$ constructed by signals $f_1$, ... . For example, the signal $e_3$ is read from the disk during the idle time period between the signals $a_2$ and $b_2$.

As above, also in the operation of recording the input signal $A_I$ and reproducing the recorded signal and outputting the signal $B_O$, the signal $e_2$ compressed to the compression time period u is read during the idle time period between the signals $a_2$ and $b_2$ starting from the time period ($t_{1A}$+u), the signals $a_2$ and $e_2$ being processed continuously in the time domain as shown in FIG. 4.

The other signals $f_2$, $g_2$, ... are processed in the similar manner during respective idle time periods. The read operation of the compressed signals $a_2$, $b_2$, ... and that of the pre-expanded signals $e_2$, $f_2$, ... are therefore alternately and time divisionally executed to provide the improved efficiency of the operation of recording and reproducing signals of two channels.

In the above embodiment, the operations of recording, reproducing, and recording and reproducing signals of two channels have been described. Signals of three or more channels may also be processed in the manner described above. Further, although audio signals have been used in the above description, other signals such as video signals, character signals, graphic signals may also be used for the optical disc recording/reproducing.

Instead of using the separate first and second memories 7 and 14, a single memory having a large capacity may also be used by dividing the memory area into two independent areas which are controlled separately by the system controller 8.

Still further, although necessary data is read from either the first memory 7 or second memory 14 under the control of the system controller 8, an external switching circuit may be used to selectively transfer necessary data to the modulator 9 or from the demodulator 13.

As described so far, according to the optical disc recording/reproducing apparatus of the present invention, a plurality of independently controllable memories are used to time divisionally record/reproduce a plurality channel of signals by using the idle time periods and head block. Accordingly, it is possible to perform the operation of recording, reproducing, or recording and reproducing a plurality channel of signals efficiently and in a short time.

A plurality type of musical audio tone signals may be recorded on multiple trucks. In this case, reproduced tone signals are mixed by a mixer as desired to generate desired musical tones of a high quality, or mixed musical tone signals may be recorded again.

Since it is possible to perform the operation of recording, reproducing, or recording and reproducing a plurality channel of signals efficiently and in a short time, other information such as voices, speeches, songs, foreign languages maybe recorded while listening to the reproduced information, to use an optical disc recording/reproducing apparatus more effectively.

The apparatus of the invention is simple in structure, and the function of the apparatus may be improved easily depending upon the control software for a memory without an increased cost.

What is claimed is:

1. An optical disc recording and reproducing apparatus comprising:

compression means for compressing an input signal for each of a predetermined block length to generate a first compressed signal which is a series of compressed input signal blocks;

an input memory for temporarily storing the compressed input signal blocks;

a head unit for recording said compressed input signal blocks onto an optical disc and reproducing recorded compressed signal blocks from the optical disc;

control means for intermittently reading out the compressed input signal blocks from said input memory and controlling said head unit to record the intermittently read-out compressed input signal blocks onto the optical disc and for controlling said heat unit to pick-up recorded compressed signal blocks for a different program from said input signal from the optical disc;

an output memory for temporarily storing the picked-up compressed signal blocks; and expansion means for expanding the compressed signal blocks which are continuously read-out from said output memory, to generate a reproduced signal, wherein said control means controls said head unit to pick-up each recorded compressed signal block during a non-recording interval between intermittent recordings.

2. An optical disc recording apparatus comprising:

first compression means for compressing a first input signal for each of a predetermined block length to generate a first compressed signal which is a series of compressed input signal blocks which intermittently occur;

second compression means for compressing a second input signal for each of a predetermined block length to generate a second compressed signal which is a series of compressed input signal blocks which intermittently occur;

an input memory for temporarily storing the compressed input signal blocks of the first and second compressed signals;

a head unit for recording the compressed input signal blocks of the first and second compressed signals onto an optical disc; and control means for controlling said head unit to record the compressed input signal blocks read out from the memory onto the optical disc, wherein said control means controls said first and second compression means so that the series of compressed input blocks of the second compressed signal occurs not to timely overlap the series of compressed input blocks of the first compressed signal by shifting the timing of blocking for the second input signal from that of blocking for the first input signal by an interval larger than or equal to one compressed signal length (u) to perform the compression operation on the second input signal after the completion of the compression operation on the first input signal and to successively store the compressed input signal blocks of the first and second compressed signals into said input memory;

wherein said control means controls said head unit to record each compressed input signal block of the second compressed input signal during a non-recording interval between recordings for the compressed input signal blocks of the first compressed signal.

* * * * *